United States Patent [19]

Finkenbiner

[11] 4,121,851
[45] Oct. 24, 1978

[54] SPINNER FOR BIKE HUB

[75] Inventor: Kenneth N. Finkenbiner, Dallas, Tex.

[73] Assignee: Ken-Neil Inc., Dallas, Tex.

[21] Appl. No.: 770,855

[22] Filed: Feb. 22, 1977

[51] Int. Cl.² .......................... B62J 5/20; G02B 5/12
[52] U.S. Cl. .................................. 280/289 R; 350/99
[58] Field of Search ............ 280/289 R, 289 D, 1.14;
350/97, 99, 103, 105; 40/125 M, 129 B

[56] References Cited
U.S. PATENT DOCUMENTS

| 2,569,212 | 9/1951 | Zagotti | 40/129 B |
| 4,033,630 | 1/1977 | Kirk | 350/99 |
| 4,047,800 | 9/1977 | DiBease | 350/99 |

FOREIGN PATENT DOCUMENTS 380,279  9/1932  United Kingdom .................. 350/99

*Primary Examiner*—Joseph F. Peters, Jr.
*Assistant Examiner*—Donn McGiehan
*Attorney, Agent, or Firm*—Hubbard, Thurman, Turner, Tucker & Glaser

[57] ABSTRACT

A spinner for attachment to the hub of a bicycle wheel is disclosed. The spinner comprises a resilient band having end portions which when spread apart permit the band to be mounted around the hub of the bicycle wheel. Secured to the band are a group of discs each having a display surface which projects radially with respect to the axis of the hub. In a preferred embodiment, each display surface is covered by an adhesive sticker having a colored, light-reflective surface.

9 Claims, 6 Drawing Figures

SPINNER FOR BIKE HUB

BACKGROUND OF THE INVENTION

1. Field of the Invention

This invention relates generally to ornamental safety equipment for bicycles, and more particularly to the structure of a spinner for attachment to the hub of a bicycle wheel.

2. Description of the Prior Art

Accidental collisions of automobiles and bicycles often occur at dusk or at nighttime or at other time when visibility is limited. Such collisions usually occur because the driver of the automobile does not have sufficient notice or warning of the presence of the bicycle to permit him to stop or to take evasive action. The risk of a rear-end collision is reduced since most bicycles are equipped with a rear reflector which is visible when illuminated by the headlights of an automobile. However, the rear reflector is not as effective in providing a warning to cars approaching a bicycle moving laterally with respect to the line of travel of the automobile, for example as is the case involving a broadside collision of an automobile and bicycle at an intersection. To avoid such a broadside collision, the driver of the automobile will stop if there remains sufficient time to come to a complete halt before striking the bicycle, and he may also choose to take evasive action to avoid a collision. Therefore, in such a situation, it would be desirable to equip the bicycle with a passive signaling device which is visible when illuminated by the headlights of an approaching automobile and which gives an indication of the direction and speed at which the bicycle is traveling so that the driver of the automobile may turn aside if there is not sufficient time to come to a complete halt.

SUMMARY OF THE INVENTION

It is an object of the present invention to provide a passive signaling device for attachment to a bicycle which is visible when illuminated by the headlights of an automobile approaching laterally with respect to the line of travel of the bicycle and which alerts the driver of the automobile to the presence of the bicycle and provides an indication of whether the bicycle is stationary or moving, and if it is moving, an indication of the general direction in which it is traveling.

According to one aspect of the invention, a spinner having a display surface is attached to the hub of a bicycle wheel. When the spinner is mounted on the hub of the bicycle wheel, the display surface projects radially with respect to the axis of the hub and includes a planar surface which is disposed at right angles with respect to the axis of the hub so that the display surface may be seen by an observer, for example the driver of an automobile, approaching the bicycle from either side. Light-reflective covers of different colors are attached to the display surfaces and create a multicolored rotating pattern as the wheel of the bicycle turns. The spinner is secured in friction engagement with the hub so that the reflective covers rotate as the wheel turns to indicate the direction of travel of the bicycle. In a preferred embodiment, the spinner comprises a resilient band and a group of discs having planar display surfaces symmetrically secured around the outer periphery of the band. When illuminated by the headlights of an approaching automobile at night, this structure creates a brilliant rotating display which indicates the presence of the bicycle and also provides a general indication of the speed and direction in which it is traveling.

BRIEF DESCRIPTION OF THE DRAWING

The invention will be more fully understood from the following detailed description, taken in connection with the accompanying drawing, in which.

DETAILED DESCRIPTION

Figure 1:
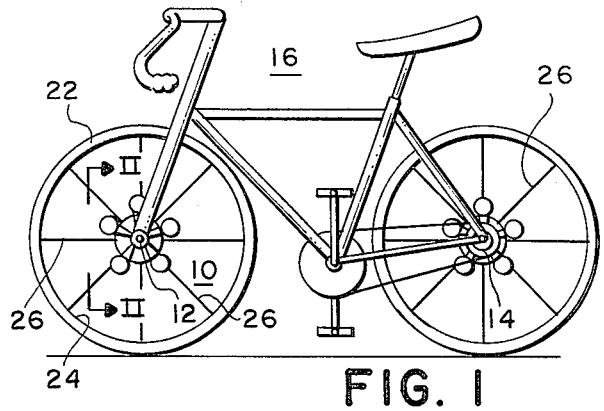
FIG. 1 is an elevation view of a bicycle which is equipped with a spinner constructed according to the teachings of the present invention.
Figure 3:
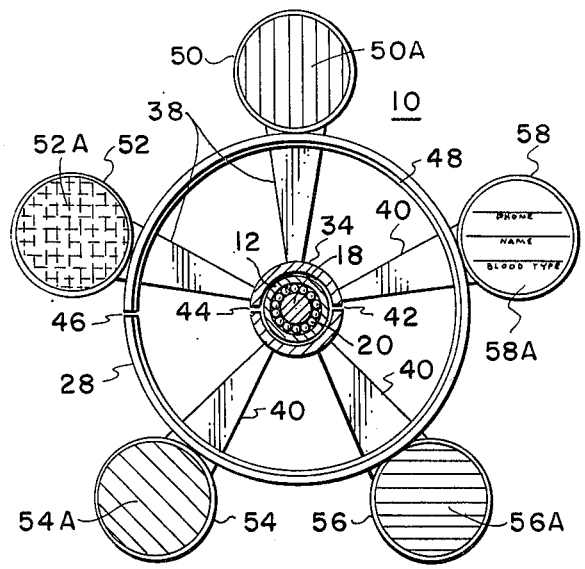
FIG. 3 is an elevation view, partly in section, taken along the line III—III of FIG. 2.

Referring now to FIG. 1 of the drawing, a spinner assembly 10 is shown attached to the front and rear hubs 12, 14 of a bicycle 16 having any conventional construction. The hub 12 is supported for rotational movement about an axle 18 in any suitable manner, for example by means of a roller bearing assembly 20 as shown in FIG. 3 of the drawing. A rubber tire 22 is secured around a wheel 24 which is joined to the hub 12 by means of tension spokes 26 in the usual manner.

Figure 4:
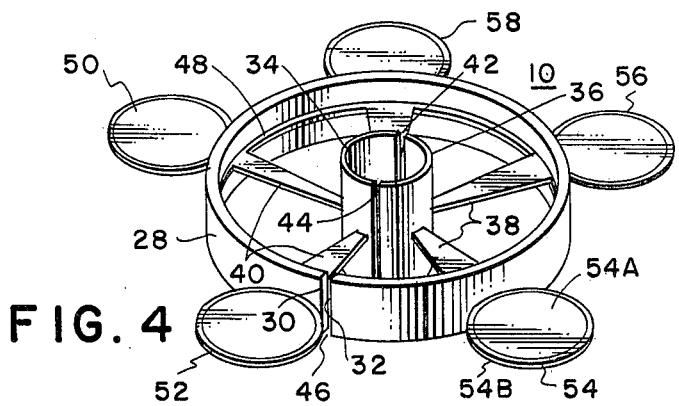
FIG. 4 is an isometric view of the spinner shown in FIGS. 1-3.
Figure 5:
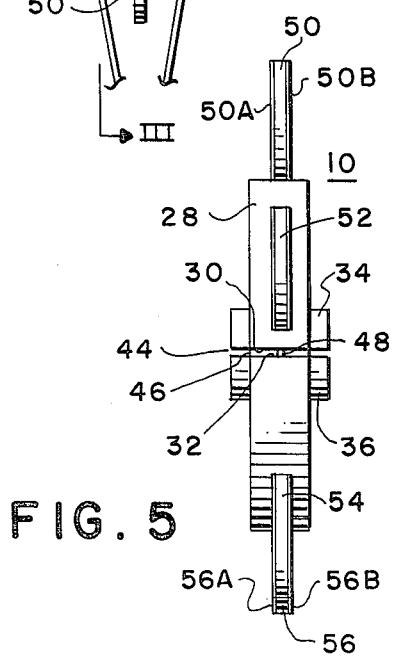
FIG. 5 is a side elevation view of the spinner shown in FIG. 4.

Details of the structure of the spinner assembly 10 can best be understood by referring to FIGS. 3, 4 and 5. The spinner assembly 10 includes a resilient band 28 having end portions 30, 32. Concentrically disposed within the band 28 are a pair of cylindrical half-section members 34, 36 which are supported in a symmetrical arrangement by means of webs 38, 40. The cylindrical half-section members 34, 36 function cooperatively as a clutch for engaging the hub 12. The opposed half-section cylinder members 34, 36 define slots 42, 44 which are radially aligned with a slot 46 defined by the opposed band end portions 30, 32. Since the slots 42-46 are in radial alignment, they define a continuous radial corridor as the end portions 30, 32 are spread apart to permit the cylindrical half-section members to be placed around the hub 12.

According to an important feature of the invention, the diameter of the assembled cylindrical half-section members 34, 36 is large enough to permit them to contact the hub 12 in friction engagement so that the spinner 10 will rotate as the wheel 24 turns. The magnitude of the frictional force of engagement between the cylindrical half-section members 34, 36 and the hub 12 should be sufficiently large to permit the spinner assembly 10 to turn in synchronism with the hub as the bicycle wheel turns at a constant velocity.

According to another aspect of the invention, it is also desirable that the spinner have a moment of inertia sufficiently large enough to overcome the force of friction so that the spinner 10 will turn at an angular rate different from that of the wheel as it is accelerating or de-accelerating. According to this arrangement, the spinner rotates with respect to the hub, for example when the bicycle is brought to a stop, because the moment of inertia of the spinner forces the spinner to rotate at an angular velocity different to that of the hub, and in some cases will continue to turn for a short period after the wheel comes to a complete stop. The relative motion of the spinner with respect to the hub and the frictional engagement of the cylindrical half sections with the hub keep the hub clean and free of debris.

For most effective operation, the frictional force should be great enough to ensure that the spinner 10 rotates in synchronism with the hub and wheel so that its rotation will provide an indication of the speed of the bicycle to an observer. However, although synchronous rotation of the spinner with the wheel is preferred, the diameter of the portions of the spinner which engage the hub may be larger than the diameter of the hub so that the spinner slips continuously with respect to the hub.

The spinner 10 is preferably integrally formed of a plastic material in an injection molding procedure. The stiffness of spring constant of the band 28 may be increased by the provision of a rib 48 formed along the inner periphery of the band, or alternatively, around the outer periphery of the band 28. It is necessary that the end portions 30, 32 are capable of being opened by the manual application of a spreading force to permit the assembly to be placed around the hub 12. The spring constant of the band provides that the cylindrical half-section members 34, 36 will be forced into a compressive union with the hub 12 so that the frictional force of engagement will cause the spinner to rotate in synchronism with the hub as the wheel 24 turns.

According to the invention, a member such as a disc having a planar display surface is secured to the outer periphery of the band 28 and a light-reflective, colored adhesive cover is secured to the display surface. Various other display arrangements may be used to good advantage. However, a symmetrical arrangement of discs 50–58 such as shown in FIGS. 3 and 4 is preferred. Each of the discs 50–58 include a pair of opposite faces or display surfaces to which colored, light-reflective covers 50A–58A are secured. Colored, light-reflective covers 50B–58B are also secured to the opposite side of the discs 50–58, respectively. The covers 50A,B–58A,B preferably include an adhesive backing 59 for attachment to the planar display surfaces of the discs. The covers may all be of the same color or may be of different colors according to personal preference. If desired, an adhesive label similar to the covering 58A of FIG. 3 having a legend preprinted for the entry of personal identification data may also be included.

Figure 6:
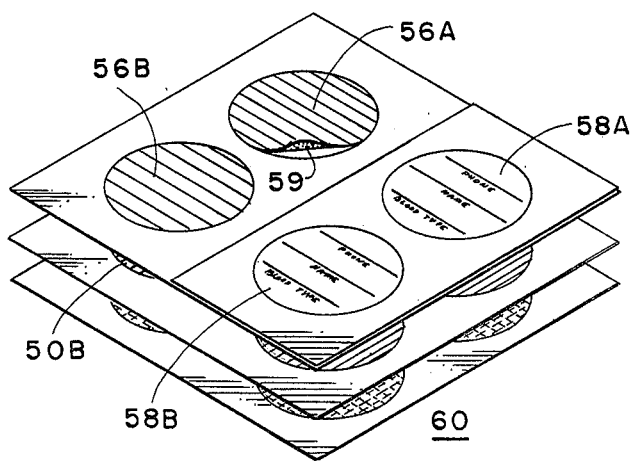
FIG. 6 is an isometric view of an assortment of colored, reflective stickers adapted for attachment to the display surfaces of the spinner.

The adhesive covers 50A,B–58A,B may be preassembled at the time of manufacture or they may be provided as a part of a kit which includes the spinner 10 and an assortment 60 of the adhesive covers as shown in FIG. 6 of the drawing. The reflective coverings as shown in FIG. 6 are preferably circular and have a diameter substantially equal to the diameter of the discs and may comprise a suitable reflective material such as "Scotch Lite". If the reflective surface is applied to the disc at the time of manufacture, it may be desirable to apply a coating of reflective paint as a substitute for the adhesive coverings.

Figure 2:
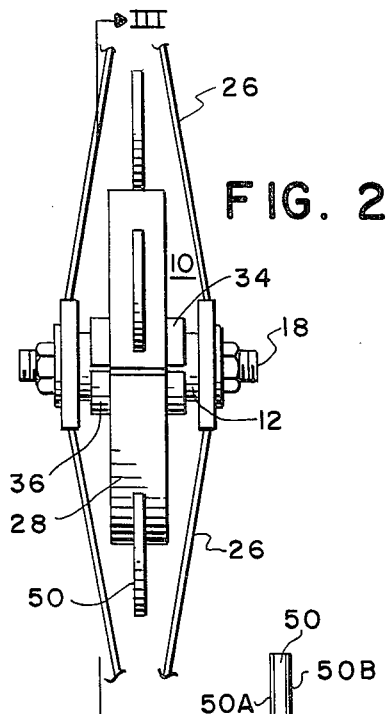
FIG. 2 is a side elevation view of a spinner and wheel assembly taken substantially along the line II—II of FIG. 1.

It is important that the axial width of the cylindrical half-section members 34, 36 be greater than the axial width of the band 28 to ensure that the discs 50 do not become entangled in the spokes 26 as shown in FIG. 2 of the drawing. The overall diameter of the spinner assembly 10 may be of any convenient size provided, however, it can be inserted between the spokes and into the space enclosed by the spokes for mounting around the hub 12.

Although the supporting ribs 38, 40 are shown to be relatively narrow having the appearance of spokes, a single web 38 and a single web 40 may be utilized to interconnect the cylindrical half-section members 34, 36 with the band 28. When this supporting arrangement is used, it is desirable that each of the webs 38, 40 span an arc approximately equal to 180°. With this construction, a decorative covering having for example a spiral pattern may be secured to the webs 38, 40. Other decorative coverings could be used to display symbols or logos illustrating school affiliations or sports preferences.

It is essential for effective operation that at least one reflective covering be secured on each side of the spinner assembly 10. Although a single spinner assembly 10 may be used to good advantage, it is desirable that each hub be equipped with a spinner assembly as shown in FIG. 1 to provide a positive indication of the approximate location of the front of the bicycle with respect to the rear of the bicycle. With this information, together with an indication of the direction and speed of the bicycle, the driver of an oncoming vehicle is less likely to misjudge the distance separating his automobile from the bicycle and thereby avoid a broadside collision.

Although a preferred embodiment of the invention has been described in detail, it should be understood that various changes, substitutions, and alterations can be made therein without departing from the spirit and scope of the invention as defined by the appended claims.

What is claimed is:

1. A spinner for attachment to the hub of a bicycle wheel comprising:

a resilient band having first and second end portions capable of being opened by the application of a spreading force between the end portions to permit the band to be placed around the hub, said band assuming a generally circular configuration of a fixed diameter in the absence of the spreading force;

first and second curved coupling members each having a radius of curvature less than the radius of said circular band but large enough to permit the curved coupling members to fit in friction engagement around a portion of the hub;

first means connecting said first curved coupling member to the inner periphery of said band and in concentric relation with respect to the longitudinal axis of said band;

second means connecting said second curved coupling member to the inner periphery of said band and in concentric relation with respect to the longitudinal axis of said band, said first and second curved coupling members being spaced apart one from another; and, a member having a display surface secured to the outer periphery of the band and projecting radially with respect thereto.

2. The spinner as defined in claim 1 wherein said first and second connecting means each comprise at least one web projecting radially between said band and the curved coupling member to which it is connected.

3. The spinner as defined in claim 1, said first and second curved coupling members each comprising generally a cylindrical half section, the axial width of the half sections being substantially greater than the axial width of said band, and being smaller than the axial width of the hub lying between the spikes which support the wheel on the hub.

4. The spinner as defined in claim 1, the diameter of the assembled combination of said first and second curved coupling members being large enough to permit said curved coupling members when placed around the hub to contact the hub in frictional engagement, the magnitude of the frictional force of engagement being sufficiently large to permit the spinner to turn in synchronism with the hub as the bicycle wheel turns at a constant velocity.

5. The spinner as defined in claim 4, said band, display member, and curved coupling members in combination having a moment of inertia sufficiently large to overcome the force of friction to permit the spinner to turn at an angular rate different from that of the wheel as the wheel is accelerating or deaccelerating.

6. The spinner as defined in claim 1 wherein said display member includes a disc having a planar display surface.

7. The spinner as defined in claim 6 wherein the planar display surface of said disc is coated with a layer of light reflective paint.

8. The spinner as defined in claim 6, further including:
a covering for said disc having an adhesive coating on one side and a light reflective surface on the opposite side, the adhesive side of said covering being joined in an adhesive union with the planar display surface of said disc.

9. The spinner as defined in claim 6, further including:
an identification label having an adhesive coating on one side and a legend for indicating personal identification data printed on the opposite side, the adhesive side of said label being joined in an adhesive union with the planar display surface of said disc.

* * * * *